United States Patent [19]
Auclair et al.

[11] Patent Number: 5,546,425
[45] Date of Patent: Aug. 13, 1996

[54] TRANSMISSION SYSTEM FOR TRANSMITTING DATA BY A LINK COMPRISING INTERMEDIATE EQUIPMENTS AND AN INTERMEDIATE EQUIPMENT FOR SUCH A SYSTEM

[75] Inventors: Jean-Yves Auclair, Trappes; Jean-Marc Bonnet, Vanves, both of France

[73] Assignee: Lucent Technologies Inc., Murray Hill, N.J.

[21] Appl. No.: 380,535

[22] Filed: Jan. 30, 1995

[30] Foreign Application Priority Data

Feb. 2, 1994 [FR] France .................................. 94 01129

[51] Int. Cl.[6] .................................................. H04B 1/38
[52] U.S. Cl. .......................... 375/220; 375/211; 375/214; 370/13.1; 455/16; 371/48
[58] Field of Search .............................. 375/220, 219, 375/211, 214, 227; 455/226.1, 226.2, 134, 135, 14, 16; 370/97, 113.1; 371/8.2, 37.1, 37.5, 48, 49.1, 49.2, 53; 379/416

[56] References Cited

U.S. PATENT DOCUMENTS

| | | | |
|---|---|---|---|
| 3,628,149 | 12/1971 | Swan | 455/133 X |
| 4,015,205 | 3/1977 | Ikeda et al. | 455/133 X |
| 4,218,654 | 8/1980 | Ogawa et al. | 370/97 |
| 5,321,727 | 6/1994 | Bonnet et al. | 375/347 |

OTHER PUBLICATIONS

"DCN212: Equipment de Securisation par Doublement du Conduit Numerique a 2 MBITS/S", Published in the French Journal Commutation & Transmission, No. 2, 1991, pp. 77–85.

Primary Examiner—Young T. Tse
Assistant Examiner—Bryan Webster
Attorney, Agent, or Firm—Christopher N. Malvone

[57] ABSTRACT

This transmission system for transmitting data by a link comprising intermediate equipments ($I_1$ to $I_N$) is provided for connecting a transmitting side of a first user equipment (TE) with a receiving side of a second user equipment (TR). In the intermediate equipment situated on the receiving side, thus the most downstream equipment, there is provided a disturbance circuit (30) which disturbs bits at its output as a function of an error information signal that represents the quality of the received information signals in the intermediate equipments.

9 Claims, 5 Drawing Sheets

TRANSMISSION SYSTEM FOR TRANSMITTING DATA BY A LINK COMPRISING INTERMEDIATE EQUIPMENTS AND AN INTERMEDIATE EQUIPMENT FOR SUCH A SYSTEM

FIELD OF THE INVENTION

The present invention relates to a transmission system for transmitting data by a link comprising intermediate equipments, for connecting a transmitting side of a first user equipment with a receiving side of a second user equipment.

Such an invention finds important applications especially in the field of digital data transmission.

BACKGROUND OF THE INVENTION

A known system of this type for which the link is formed by at least two digital channels is described in the article by J. Y. Auclair et al. entitled "DCN212: équipement de sécurisation par doublement du conduit numérique à 2 Mbits/s", published in the French journal COMMUTATION & TRANSMISSION, no. 2, 1991, pages 77 to 85. This doubling has for its object to obtain the fewest possible errors. This doubling is effected in two intermediate equipments assigned each to user equipments. In this known system the information is organized in frames and for a certain number of frames or blocks a check code is determined, for example, a CRC (Cyclic Redundancy check) code. Management information is inserted into frames coming from the user equipment. This is effected already in the intermediate equipment assigned to the user equipment on the transmitting side. Before these frames are sent to the second intermediate equipment, another CRC code is calculated, so that the receiving equipment the information relating to blocks poorly received in the first intermediate equipment is lost. This known system cannot indicate the total quality of the link. More and more often the users require to have an indication of the total quality of their link.

SUMMARY OF THE INVENTION

To satisfy this requirement the present invention proposes a perfection of the system described in the opening paragraph in that a good indication of the total quality of the transmission between two user equipments is given.

Therefore, such a system is characterized in that in the intermediate equipment situated on the receiving side, thus the most downstream equipment, there is provided a disturbance circuit which disturbs bits at its output as a function of an information signal that represents the quality of information signals received in the intermediate equipments.

The present invention also relates to intermediate equipments suitable for such systems.

BRIEF DESCRIPTION OF THE DRAWINGS

The following description made with respect to the appended drawings all given by way of non-limiting example, will make it better understood how the invention may be realised, while

DETAILED DESCRIPTION OF THE PREFERRED EMBODIMENTS

Figure 1:
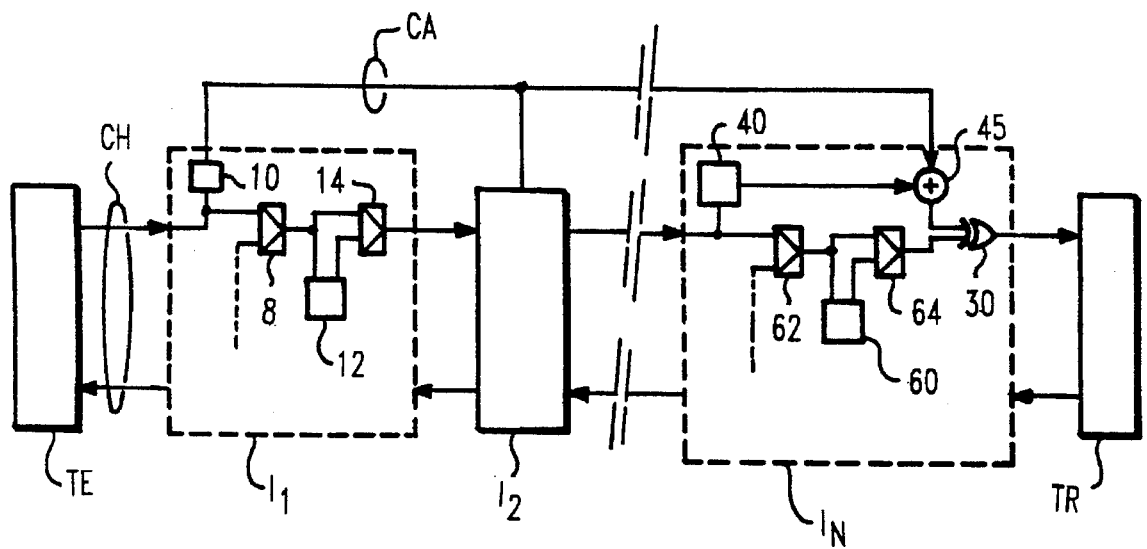
FIG. 1 shows the diagram of a system in accordance with the invention.

In FIG. 1, which represents a diagram of a system in accordance with the invention, the reference TE denotes a user equipment which is considered the point of departure of an information signal transmitted over a digital channel CH to a user equipment TR. This digital channel also ensures the transmission in the other direction. Various intermediate equipments $I_1, I_2, \ldots I_N$ are inserted between these two equipments on the digital channel. In this drawing Figure only equipment $I_1$ is shown in detail, while the other equipments can have an identical structure. This equipment $I_1$ can feed additional information to the information stream it receives from the digital channel CH. This insertion is effected by an information multiplexer 8. To guarantee a certain integrity of information, a check code is assigned to a data block for its transmission. From the moment the information is received, this check code is, on the one hand, recalculated by circuit 10 and compared with the check code that has been transmitted and, on the other hand, the code is recalculated by a calculating circuit 12 taking additional information into account. Therefore, it is created on the basis of information on the output of the multiplexer 8. This code is then fed to the digital channel by a second multiplexer 14. As this check code is produced in each intermediate circuit, the treatment it undergoes in the equipment TR no longer reflects the quality of the total transmission, because the check codes are consistent with each output of the intermediate equipments and therefore masks the errors occurring upstream of the last intermediate equipment, which errors can be detected by this check code.

According to the invention and to be able to appreciate the quality of the transmission between the equipments TE and TR, there is proposed that in the intermediate equipment $I_N$ situated on the receiving side, thus the most downstream equipment, a disturbance circuit 30 is provided which disturbs bits on its output as a function of an information signal that represents the quality of the information signals received in the intermediate equipments.

The quality of the information signals determined by each of the intermediate equipments is transmitted by an auxiliary channel CA to the intermediate circuit $I_N$. These information signals are accumulated, as well as the quality indication effected by the circuit 40 forming part of this equipment $I_N$, by an adder circuit 45 which operates on base 2. The accumulation information influences the disturbance circuit 30 formed on the basis of an EXCLUSIVE-OR gate, so that the information on the output of the equipment $I_N$ is deteriorated as a function of the total quality of the transmission. Thus, in the terminal equipment TR one will be able to detect an information signal that has a bad check code.

In effect, according to an embodiment of the invention, this disturbance has an influence on the check codes formed by a calculation circuit 60 which has the same function as the circuit 12 already mentioned. Thus the number of data blocks assigned to these disturbed check codes, which blocks will be detected as errors in the terminal equipment TR is in conformity with the number of blocks detected as erroneous by the various intermediate equipments $I_1$ to $I_N$.

Figure 2:
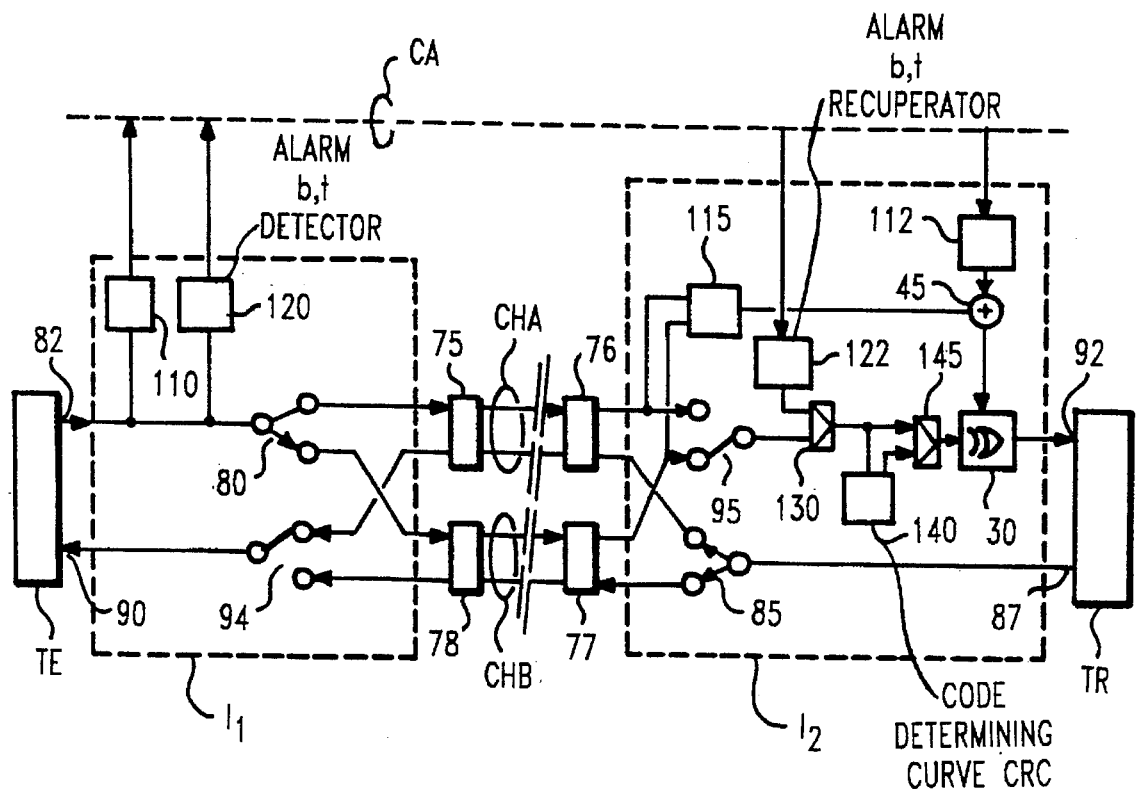
FIG. 2 shows the diagram of a second system in accordance with the invention.

FIG. 2 shows the diagram of another system according to the invention which corresponds to the system mentioned above. Like elements to those of FIG. 1 carry the same references. This system uses a 2.048 kbit/s link such as defined by Recommendation G.704 of the CCITT. The system shown comprises terminal equipments TE and TR and two intermediate equipments $I_1$ and $I_2$. The equipments TR and TE are end terminals such as cross-connect networks or multiplexers and the equipments $I_1$ and $I_2$ are duplication modules which ensure the channel duplication. Thus the channel CHA which connects equipment $I_1$ with equipment $I_2$ in the two directions of transmission is doubled by the channel CHB which ensures the same relation. Various interface circuits 75, 76, 77 and 78 called line terminals ensure the transmission and reception of signals over the channels CHA and CHB. The circuits 75 and 76 are connected to the ends of channel CHA and the circuits 77 and 78 to the ends of channel CHB. For transmission duplication the equipment $I_1$ comprises a circuit 80 for injecting into the two channels CHA and CHB the transmit information coming from the output access 82 of equipment TE, just like equipment $I_2$ which comprises an injecting circuit 85 for effecting the same operation with the two channels CHA and CHB with respect to the access information signals of the output 87 of equipment TR. The information transmitted in the two directions of transmission by the channels CHA and CHB is fed to the input accesses 90 and 92 of the equipments TE and TR while passing through selecting circuits 94 and 95. These selecting circuits 94 and 95 form part of equipments $I_1$ and $I_2$, respectively. This system and its operation are described not only in said article, but also in the documents of European Patent Specification no. 0 454 246 filed under no. 91200949.5 and no. 0 454 249 filed under no. 91200952.9. In the following of the present exposition there will only be discussed the transmission in the direction from the equipment TE to the equipment TR. Elements having the same structure and ensuring the same functions in the other direction are included in these equipments.

The information in this example is presented in the form of frames of 256 bits which form 32 time slots for 8 bits. These time slots are referenced IT0 to IT31. Also defined is a multiframe which is formed by 16 frames. The time slot IT0 is assigned especially to certain management tasks of the frames and multiframes. Thus, the first bit of this time slot transmits a code CRC4 of 4 bits for a block of 2048 bits (that is 16 frames). This code CRC4 is defined in said Recommendation. Each bit of this code is transmitted every other frame. This code CRC4 calculated prior to transmission is thus transmitted to be compared with the code CRC4 calculated at the receiving end. If there is a discrepancy between these two codes, there is announced that there has been an error in the transmission and a faulty block is counted. The time slots IT0 are also used for managing the links between the equipments $I_1$ and $I_2$. For example, they may transmit a bit that indicates an alarm. The modification of the time slot IT0 imposes a recalculation of CRC 4 in each channel CHA and CHB, so that the number of error blocks received by the equipment TR is not representative of the quality of the link between TE and TR.

In FIG. 2 reference 110 denotes an error block detector which operates, as this has already been observed with respect to the comparison of the CRC codes transmitted by the user equipment TE and the code calculated from the received frames. If the result of the comparison is wrong, this is transmitted by the channel CA to the equipment $I_2$. The adder circuit 45 superposes this information which is recuperated by a recuperator circuit 112 on the information produced by another error block detector 115 situated in this equipment $I_2$. The disturbance circuit 30, constituted on the basis of an EXCLUSIVE-OR gate, is connected between the output of the channel selected by the circuit 95 and the access 92, so that a signal "1" coming from the circuit 45 then changes the value of the bit of the selected circuit. According to a characteristic feature of the invention this modification takes place only with the bits forming the code CRC 4 assigned to the frames coming from the selected channel.

According to an important characteristic feature of the invention there is proposed to transmit the alarm bit BE known under the name of bit E which is also defined by said Recommendation. This bit is positioned by equipment TE and is detected in the intermediate equipment $I_1$ by the alarm bit detector 120, so that it is transmitted to the intermediate equipment $I_2$ by the auxiliary channel CA. This bit is recuperated by the alarm bit recuperator circuit 122, so that it is put into place in the frame by a multiplexer 130. Then a code determining circuit CRC 140 determines the check code which is inserted into the frame by a second multiplexer 145. The disturbance circuit 30 is connected to the output of this multiplexer 145.

The channel CA may be constituted by a frame formed by bits available in the time slot IT0 inside the frame corresponding to said Recommendation. In practice, four bits are used to indicate the number of blocks CRC4 detected as error blocks among the eight blocks received last (one block=8 frames of 32 IT). These four bits are thus transmitted every 8 ms. Similarly, on the output of equipment $I_2$ as many blocks will be disturbed by the intermediary of circuit 3a as indicated by these four bits.

Figure 3:
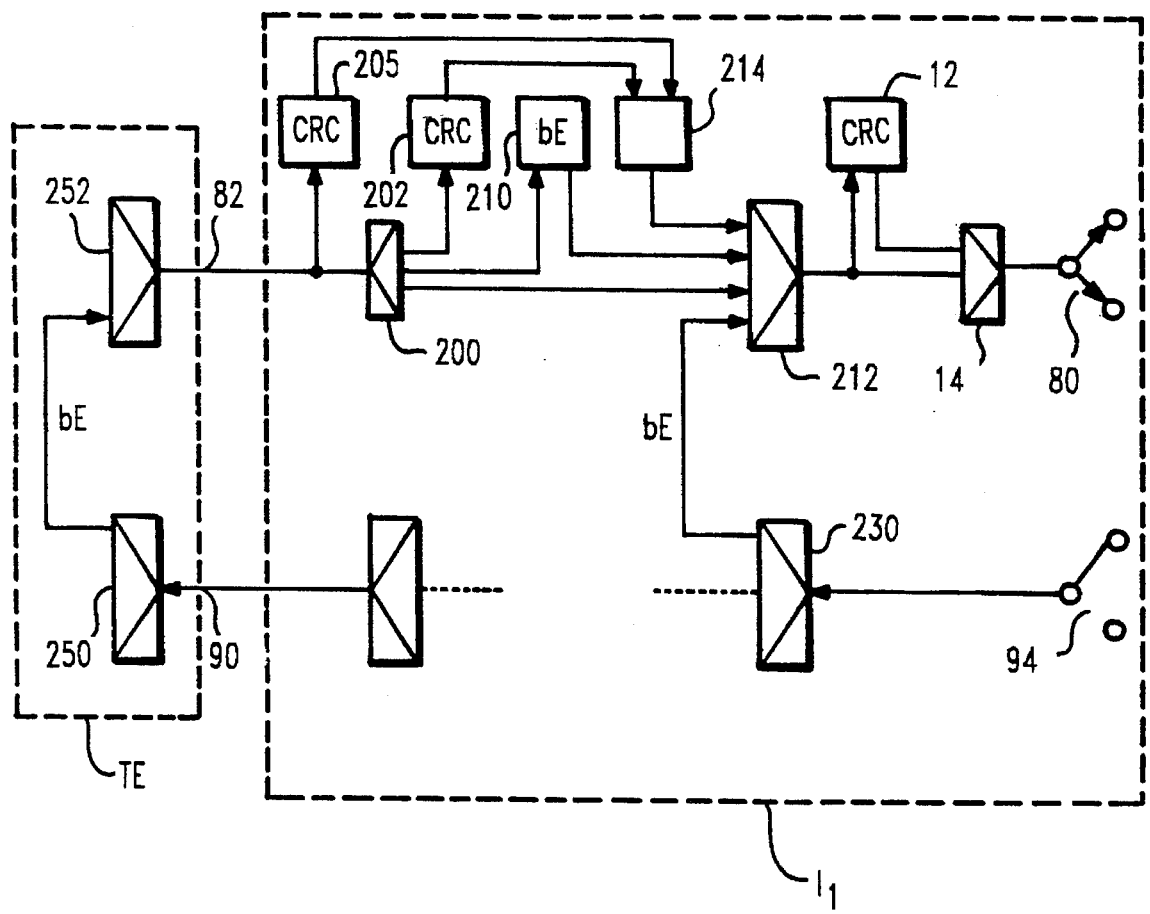
FIG. 3 shows the receiving section of an intermediate equipment.

In FIG. 3 there is shown in more detail the receiving section of the intermediate equipment $I_1$ and its interaction with the terminal equipment TE. Like elements to those of the preceding Figure carry the same references.

Equipment $I_1$ comprises a first demultiplexer 200 whose input is connected to the output access 82 of the terminal equipment TE. This demultiplexer produces said check code on a first one of its outputs. This code is transmitted from equipment TE and is stored in a register 202 to be compared with the CRC code calculated by the circuit 205 based upon the data stream coming from the access 82. On a second one of its outputs the demultiplexer produces the alarm bits which are stored in a register 210 and on a third one of its outputs the payload information. A multiplexer 212 multiplexes various information signals received on its inputs. A first one of its inputs receives the result of the comparison of the check codes to transmit on channel CA the indication of the number of error blocks defined by the circuit 214 which effects the comparison between calculated and transmitted codes. The channel CA is here constituted by a sub-frame provided in the frame defined by said Recommendation G.704. On a second input the multiplexer receives the bit stored in register 210 to be transmitted, also this bit, in the sub-frame. The third input receives the payload to be transmitted. As for the fourth input, it receives the indication of the alarm bit detected in the return channel and taken off by a demultiplexer 230 connected to the return channel. This alarm bit is sent in the position provided for this purpose by said Recommendation. Thus there is no interference between these alarm bits which can be managed in an independent manner. For example, they may be managed for each channel CHA and CHB independently of those transmitted in said sub-frame. The alarm bit stored in register 210 results from a poor transmission between equipment $I_1$ and equipment TE. In the latter equipment it is rendered available on an output of a multiplexer 250 and is transmitted to an input of a multiplexer 252 whose output is connected to access 82. Thus, the alarm bits are transmitted to the equipment I₂ by different paths. On the output of the multiplexer 212 the value of the check code is calculated by circuit 12, so that this code value is sent to the intermediate equipment I₂ via the multiplexer 14.

Figure 4:
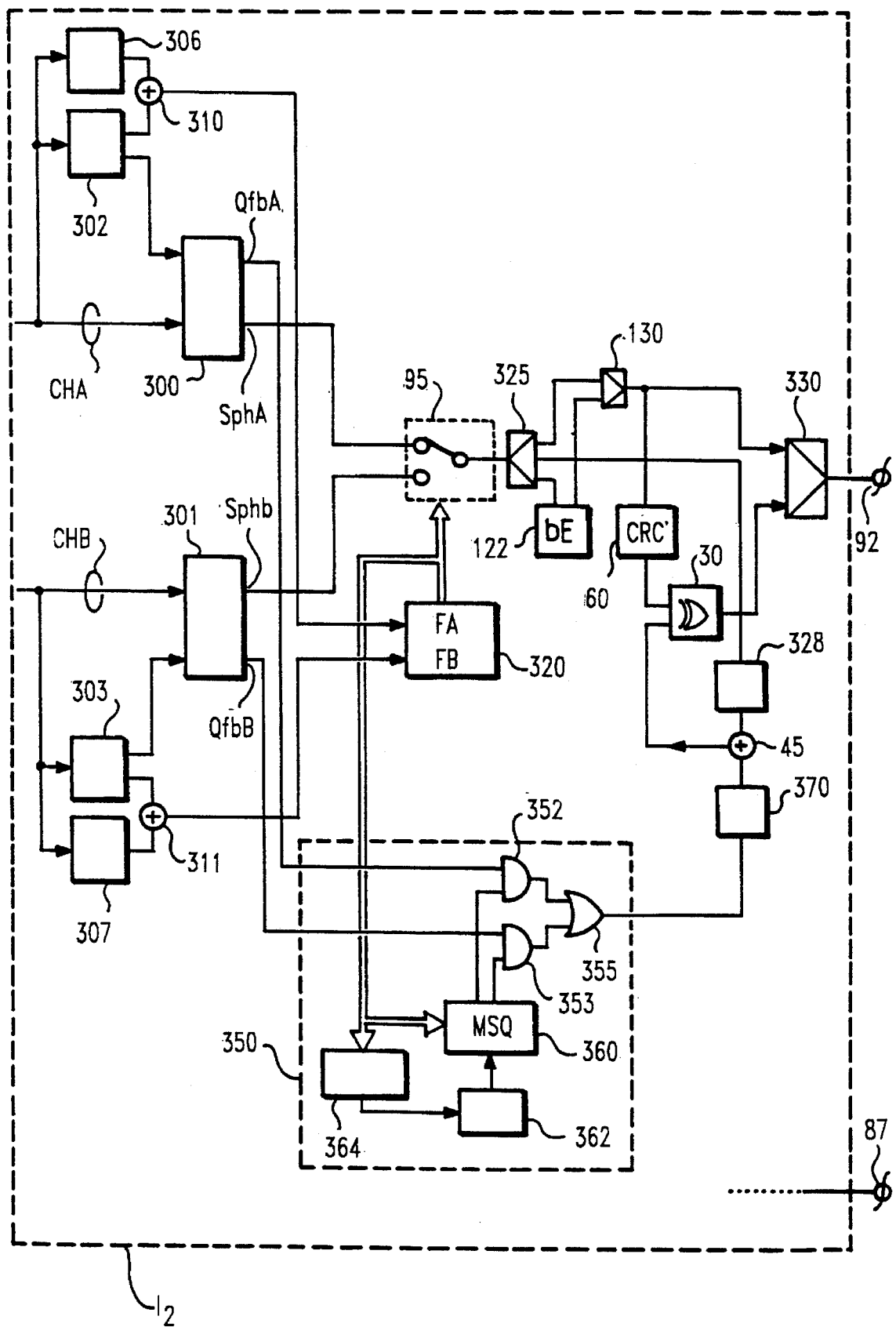
FIG. 4 shows the transmitting section of an intermediate equipment.

FIG. 4 shows in more detail the receiving section of equipment I₂.

In this drawing Figure the references 300 and 301 represent memories of the circular type described in said Patent Specifications, each being assigned to one of the digital channels CHA and CHB. The payload information on the respective outputs SphA and SphB of these memories is considerably shifted with time, so that the selecting circuit 95 can switch without introducing another deterioration. On each of these channels there is an error block detector 302, 303 respectively and an irregularity detector 306, 307 respectively, which irregularities may be an absence of signals, a loss of frame locking and so on. For more details one could be referred to said Patent Specifications. By means of a cumulating circuit 310, 311 respectively, the indications of malfunctioning are cumulated and are transmitted to a switch control circuit 320 for the control of selecting circuit 95. On the output of circuit 95 a demultiplexer 325 directs the alarm bit transmitted by the sub-frame forming the channel CA to the recovery circuit 122 and the number of error blocks transmitted by this channel CA to a management circuit 328. This demultiplexer also produces payload information. The calculation circuit 60 supplies its code to an input of the disturbance circuit 30. A multiplexer 330 supplies in multiplexed form to the access 92 the information presented to its two inputs. To its first input are presented the valid information signals rendered available on the output of multiplexer 130 which inserts the alarm bits in their places and on a second input the disturbed or not disturbed check code. In order that the check code is disturbed in a suitable manner as a function of the quality of the blocks tapped from the channels CHA and CHB, a disturbance control circuit 350 has been provided. This circuit utilizes the control signals coming from circuit 320 and the signals at the ends of the error blocks coming from the outputs QfbA, QfbB of the memory circuits 300 and 301. These signals come from the circuits 302 and 303 respectively, and are stored in the circular memories 300 and 301 in the same parallel manner as the information coming from CHA and CHB. The circuit 350 comprises a switching circuit for transmitting these output signals QfbA and QfbB to the disturbance circuit 30. This switching circuit is formed by AND gates 352 and 353 and by an OR gate 355 whose inputs are connected to the outputs of the AND gates 352 and 353. This circuit makes it possible to route the signals present on the outputs QfbA, QfbB to the disturbance circuit 30 as a function of the signals coming from a state machine 360 which produces a binary word MSQ of two bits. The first bit causes the gate 352 to be opened; the signal then has the value "1" and the second bit causes the gate 353 to be opened. The states of this machine depend on the output signal of a delay circuit 362 which causes a delay TT in length and on the control signals of the selecting circuit 320. The delay circuit 362 is triggered by a position change detector 364 of the selecting circuit 320. A time-dependent positioning circuit 370 inserted between the output of the control circuit 350 and the disturbance circuit ensures that this disturbance will intervene with only a single bit of the check code that accompanies the transmit information to access 92. The information signals coming from circuit 370 and those coming from circuit 328 are cumulated by the circuit 45 before they are applied to the circuit 30.

Figure 5:
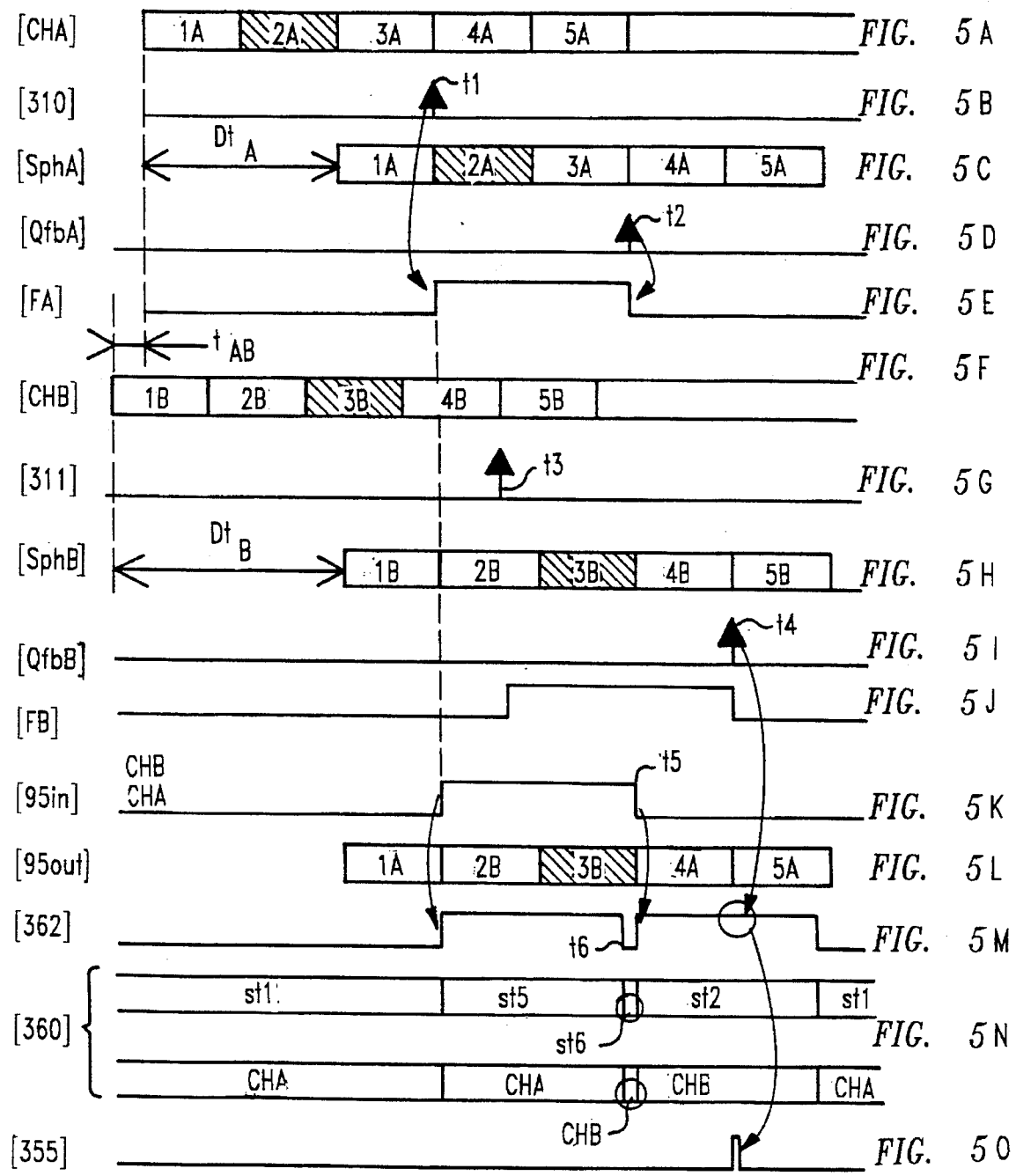
FIG. 5 is a time diagram to explain the operation of the section represented in FIG. 4.

Before embarking on the explanation of the operation of this equipment I₂, it is suitable to remark within the framework of this example described, that a block is declared erroneous 2 ms after the start thereof. This directly comes from said Recommendation. The delay TT caused by circuit 362 is slightly less than this value or slightly more than 1.75 ms. Reference may now be made to FIG. 5, which is a time diagram of the operation of equipment I₂.

The line [CHA] of this diagram represents a succession of block 1A, 2A, 3A, 4A, 5A . . . transmitted over channel CHA. It is admitted that block 2A is erroneous. This block is hatched in FIG. 5. This error block triggers at instant t1 an active signal on the output of the circuit 310. This is indicated on line [310] of the Figure. The line [SphA] represents the blocks which are applied to the input of the selecting circuit 95. These blocks are shifted with time by an amount Dt$_A$ determined by circuit 300. The next line [FA] represents an internal signal of circuit 320. This signal indicates, as long as it is active, that the data on the output SphA are false. This signal remains active from the instant t1 until instant t2 which corresponds to the appearance of the end-of-error-block signal which appears on output QfbA.

The line [CHB] of this diagram represents a succession of blocks 1B, 2B, 3B, 4B, 5B . . . transmitted over channel CHB. These blocks correspond, respectively, to the blocks 1A, 2A, 3A, 4A, 5A transmitted over channel CHA. There is a time shift t$_{AB}$ between the blocks of channel CHA and the blocks of channel CHB. It will be recollected that it is the object of the circuits 300 and 301 to apply to the inputs of the selecting circuit 95 blocks which substantially coincide. It is admitted that block 3B is erroneous; this block is hatched in FIG. 5. This error block triggers at instant t3 an active signal on the output of the circuit 311. This is indicated on line [311] of the Figure. The line [SphB] represents the blocks which are applied to the input of the selecting circuit 95. These blocks are shifted with time by an amount Dt$_B$ caused by the circuit 301. The next line [FB] represents an internal signal of the circuit 320. This signal indicates, as long as it is active, that the data on the output SphB are false. This signal remains active from instant t3 until instant t4 which corresponds to the appearance of the end-of-error-block signal which appears on output QfbB. The line [95 in] shows the change of position of the selecting circuit 95. It is admitted that prior to instant t1 the selecting circuit tapped the information signals from channel CHA. Because the signal FA changes to the active state, the circuit 95 chooses to tap the information from the channel CHB at instant t1. This change is detected by the circuit 364 which circuit triggers the delay circuit 362. As an error block is detected on channel CHB at instant t3, this detection causes at instant t5 the selecting circuit on channel CHA to be triggered after the end of this error block. The end of the delay started at instant t1 is terminated at instant t6 slightly before instant t5. The line [360] shows in its upper part the changes of state of the machine 360 and in its lower part the authorization to change to A or B for the signals coming from the outputs QfbA and QfbB, respectively. These various states will be explained hereinafter with the aid of FIG. 6. Line [95 out] represents the blocks on the output of the selecting circuit 95. There is found that the block 3B which is an error block has been transmitted. The indication at the end of the error block is thus to trigger the disturbance circuit 30. This is indicated on line [355] which shows this change.

Figure 6:
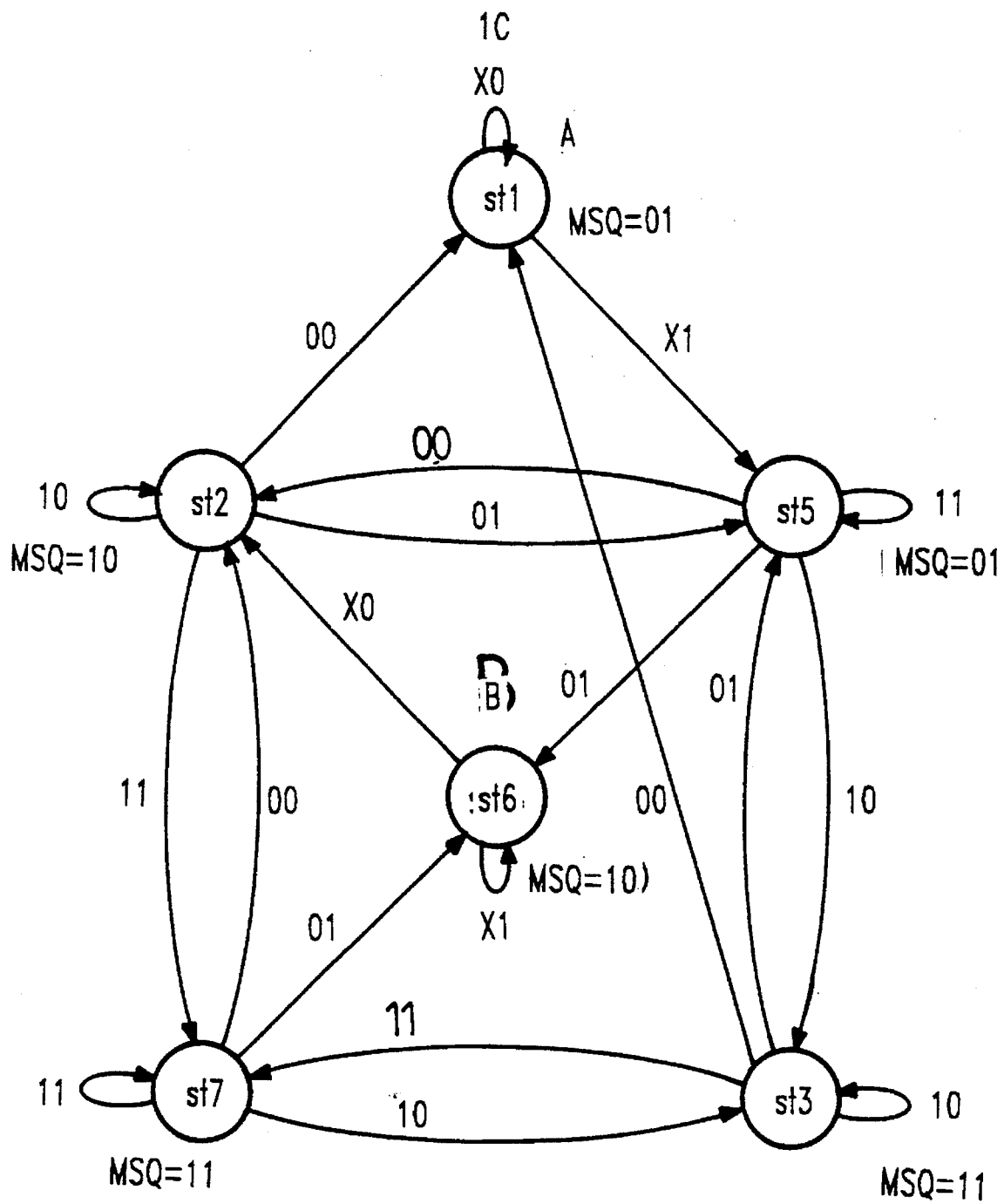
FIG. 6 is a state diagram for a state machine which forms part of the transmitting section of FIG. 4.

In FIG. 6 there is shown the state diagram of the machine 360. It is easy for those skilled in the art to realise this machine based upon the diagram. The various states st1, st2, st3, st5 and st6 are encircled. To each of these states corresponds a value of the signal MSQ which appears on the output of the machine. To the states st1 to st7 correspond the respective values MSQ which are denoted beside the circles. Two states denoted A and B are stable states in the sense that they reflect a situation in which the errors on the channels CHA and CHB have not been taken into account and that commutations inside the selecting circuit 95 need not take place. The changes of state represented by arrows are triggered by a binary word of two bits T and C. The bit T assumes the "1" value when the delay is started. The bit C is determined by the position selected in circuit 95. If the channel CHA is chosen, C has the "0" value and if the channel CHB is chosen C has the "1" value. The symbol "X" denotes that this value has no influence whatsoever on the change of state. These words are placed close to the arrows.

Resuming hereinafter the various states where TT represents the delay caused by circuit 362.

st1: the stable state for at least the duration TT. The channel CHA is switched to and the error blocks of CHA trigger the disturbance circuit 30.

st5: from st1 after a switching operation the machine passes to state st5 in the same time when the delay is initialized. This is a provisional state, for if no switching occurs before the period of the delay, the machine will go to st6. The error blocks of CHA trigger the disturbance circuit 30.

st6: similar state to state st1, but with the switch pointing to CHB. The error blocks of CHB trigger the disturbance circuit 30.

st3: from st5 if a switching operation takes place before the period of the delay, the machine passes from st5 to st3 and the delay is reinitialized. From st3 if the delay is terminated before a switching operation, the system passes to state st1. The error blocks of CHA and CHB activate the disturbance circuit 30.

st2: similar role to st5.

st6: similar role to st1.

st7: similar role to st3.

We claim:

1. A transmission system for transmitting data by a link, comprising:

a first user equipment for transmitting data in the form of blocks and check codes;

a second user equipment for receiving the data and the check codes from the first user equipment, the second user equipment coupled to the first user equipment via the link;

an intermediate equipment coupled between the first and the second user equipments on the link;

a most downstream equipment which is situated between the receiving side of the second user equipment and the intermediate equipment, and wherein the intermediate equipment includes i) a device for checking for errors in the check codes received by the intermediate equipment, ii) a device for providing a detected error signal to the most downstream intermediate equipment, and iii) a device for recalculating the check code from the received check code which includes errors and for providing the recalculated check code to the link, and wherein the most downstream equipment includes a device for receiving the detected error signals from the intermediate equipment and a device for providing the second user equipment with an error signal which is a function of the detected error signals received from the intermediate equipment.

2. The transmission system as claimed in claim 1, wherein the check code represents the quality of the data in the blocks and wherein the error signal is a change to a number of the blocks in which errors were detected by the intermediate equipment.

3. The transmission system as claimed in claim 1, wherein the system includes an auxiliary channel coupled to the intermediate equipment and the most downstream intermediate equipment and wherein the detected error signals are provided on the auxiliary channel.

4. The transmission system as claimed in claim 1, wherein there are a plurality of intermediate equipments located between the first user equipment and the most downstream user equipment.

5. The transmission system as claimed in claim 4, further comprising a return auxiliary channel coupled to the intermediate equipments for receiving the detected error signals from the intermediate equipments and for providing the detected error signals to the immediately preceding intermediate equipment.

6. The transmission system as claimed in claim 2, wherein the change to the blocks is a change in the check codes.

7. The transmission system as claimed in claim 2, wherein the device for providing the error signal is an exclusive OR gate having a first input coupled to receive the detected errors and a second input to receive a control signal.

8. A most downstream intermediate equipment for use in a transmission system for transmitting data over a link, the transmission system including, a first user equipment for transmitting data in the form of blocks and check codes, a second user equipment for receiving the data and the check codes from the first user equipment, the second user equipment coupled to the first user equipment via the link, and an intermediate equipment coupled between the first and the second user equipments on the link, and including i) a device for checking for errors in the check codes received by the intermediate equipment, ii) a device for providing a detected error signal to the most downstream intermediate equipment, and iii) a device for recalculating the check code from the received check code which includes errors and for providing the recalculated check code to the link, the most downstream intermediate equipment being situated between the second user equipment and the intermediate equipment and comprising:

a device for receiving the detected error signals from the intermediate equipment and a device for providing the second user equipment with an error signal which is a function of the detected error signals received from the intermediate equipment.

9. The most downstream intermediate equipment as claimed in claim 8, wherein the check code represents the quality of the data in the blocks and wherein the error signal is a change to a number of the blocks in which errors were detected by the intermediate equipment.

* * * * *